W. A. NEFF.
APPARATUS FOR BONDING RAILS.
APPLICATION FILED JUNE 22, 1908.

961,984.

Patented June 21, 1910.
5 SHEETS—SHEET 1.

Witnesses:
J. C. Turner
Jno. F. Oberlin

Inventor:
William A. Neff
by J. B. Fay
Attorney.

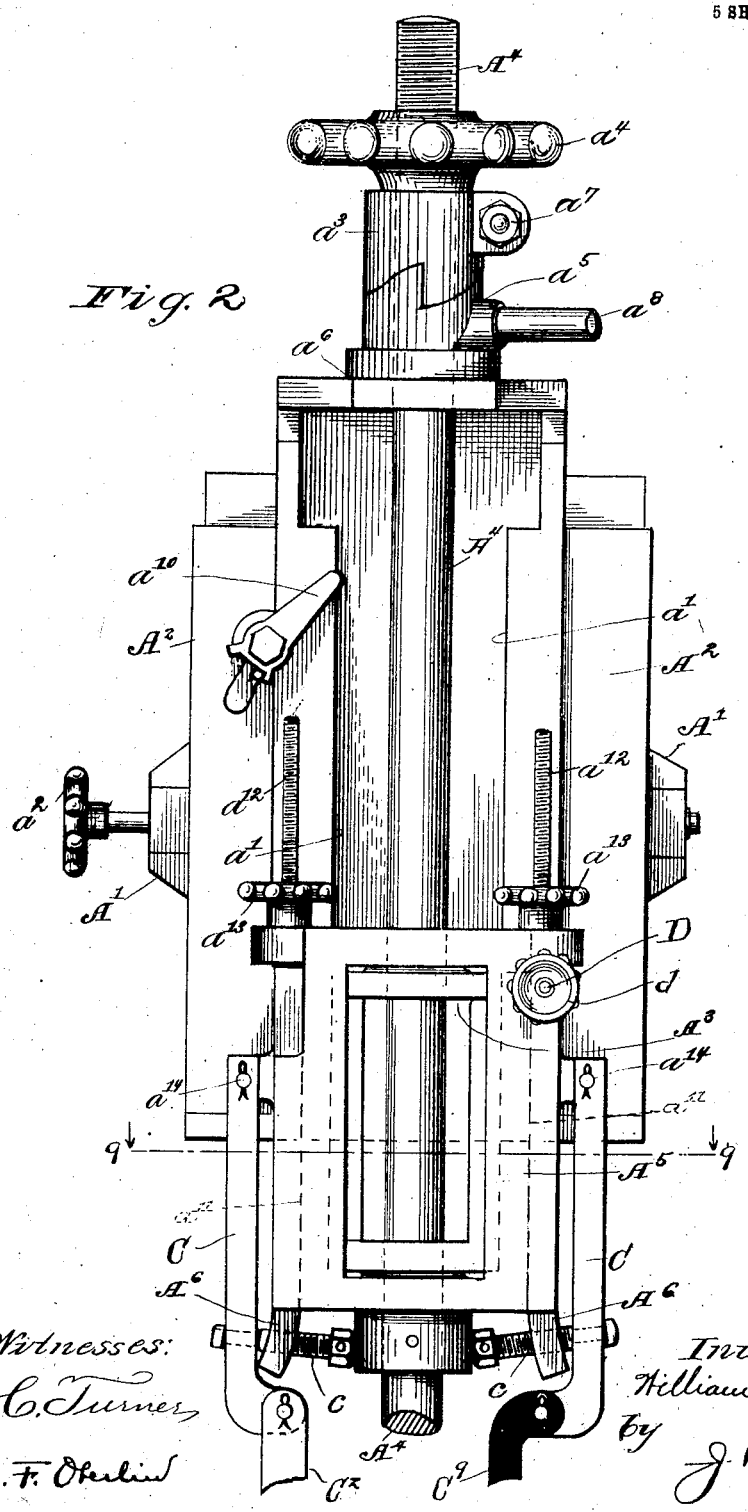

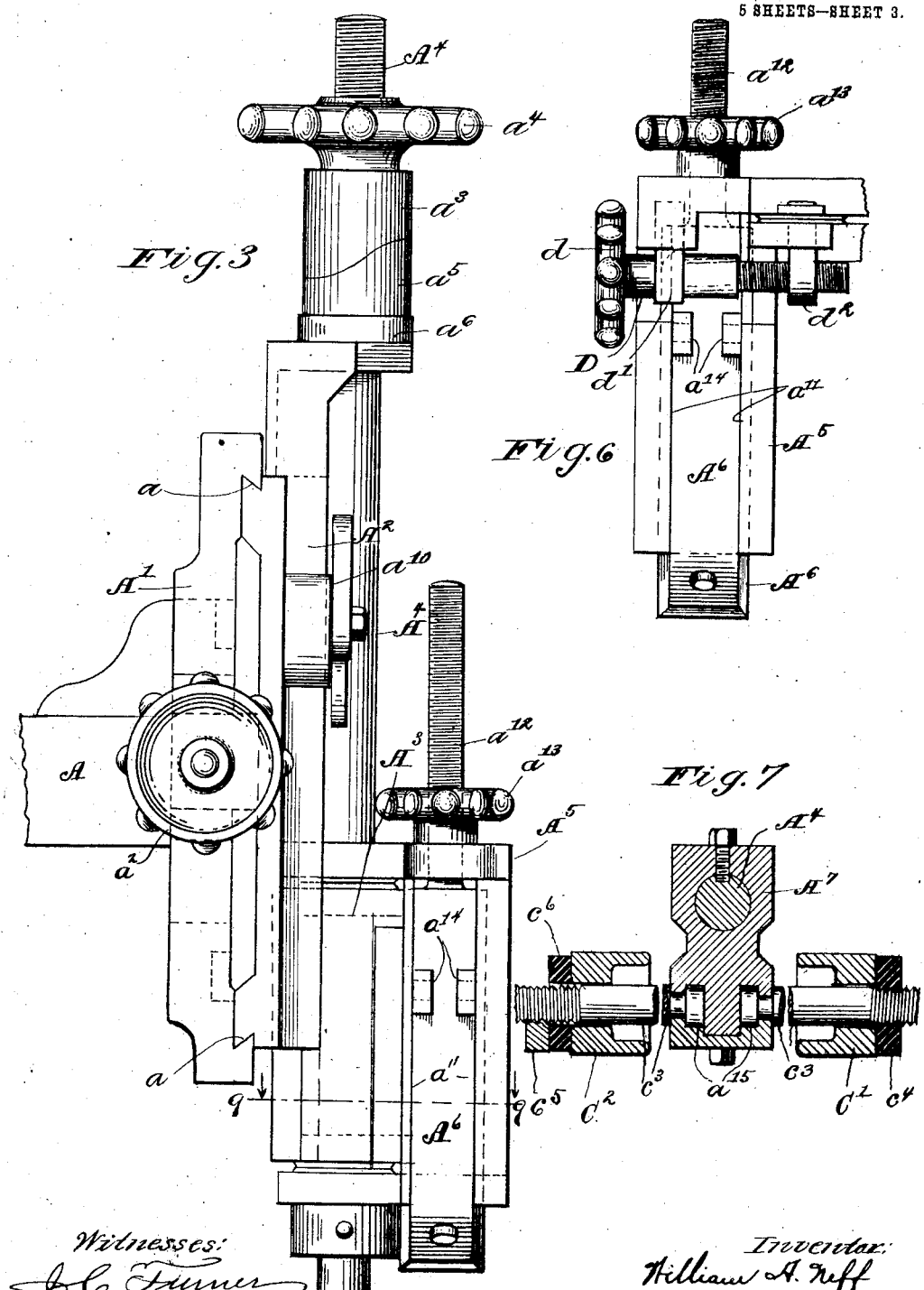

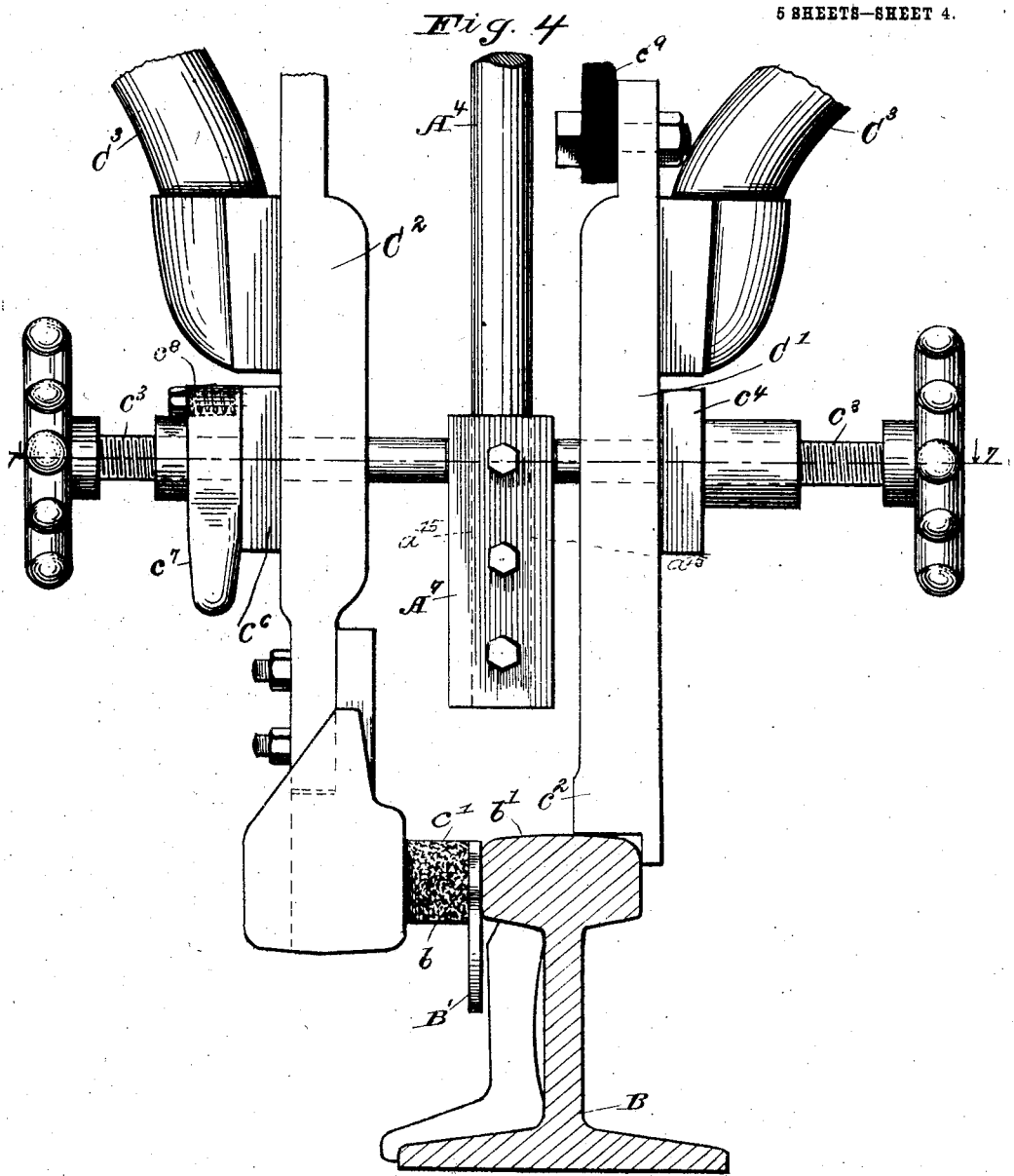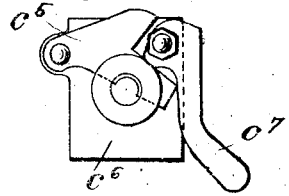

W. A. NEFF.
APPARATUS FOR BONDING RAILS.
APPLICATION FILED JUNE 22, 1908.

961,984.

Patented June 21, 1910.
5 SHEETS—SHEET 5.

UNITED STATES PATENT OFFICE.

WILLIAM A. NEFF, OF CLEVELAND, OHIO, ASSIGNOR TO THE ELECTRIC RAILWAY IMPROVEMENT COMPANY, OF CLEVELAND, OHIO, A CORPORATION OF OHIO.

APPARATUS FOR BONDING RAILS.

961,984.

Specification of Letters Patent. Patented June 21, 1910.

Application filed June 22, 1908. Serial No. 439,852.

*To all whom it may concern:*

Be it known that I, WILLIAM A. NEFF, a citizen of the United States, resident of Cleveland, county of Cuyahoga, and State of Ohio, have invented a new and useful Improvement in Apparatus for Bonding Rails, of which the following is a specification, the principle of the invention being herein explained and the best mode in which I have contemplated applying that principle, so as to distinguish it from other inventions.

The present invention relates to the art of electric welding, particularly as applied to the bonding of rails or similar conductors, wherein by the use of an electric current sufficient heat is developed at the proper points to solder, braze, or weld a bonding member across the gap intervening between the meeting ends of the rails. One type of apparatus for thus bonding rails likewise forms the subject-matter of a co-pending application of C. L. Cadle filed January 2, 1907, Serial No. 350,330.

The object of the present invention is the perfection of such apparatus whereby the same may be more perfectly adapted to the various situations encountered in practically carrying out in the field the process referred to.

To the accomplishment of these and related ends, such invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

Figure 1:
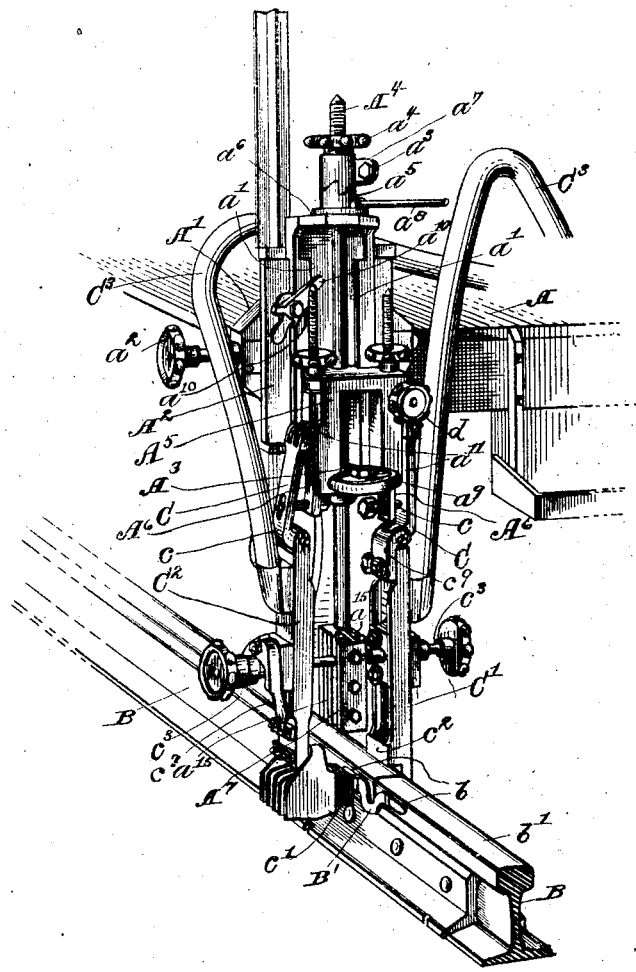
Figure 8:
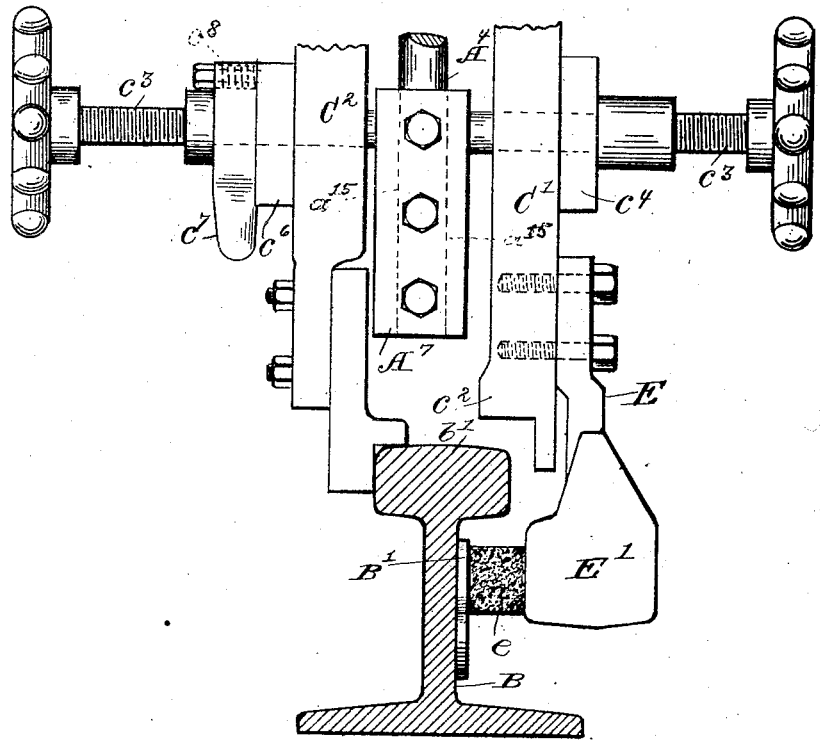
Figure 9:
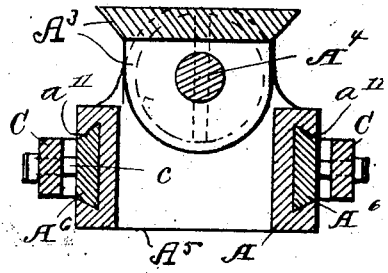

In said annexed drawings: Figure 1 is a perspective view of an approved form of my present apparatus shown in connection with a portion of the truck by means of which it is proposed to support the device when in use, and also showing sections of two meeting rails in conjunction with which the bonding operation is to be carried on; Fig. 2 is a front elevation on a larger scale of the upper portion of such apparatus; Fig. 3 is a side elevation of such upper portion; Fig. 4 is a front elevation of the lower portion of such apparatus; Fig. 5 is an elevational view of a detail of such apparatus entering into such lower portion of the apparatus; Fig. 6 is a side elevation of a detail of the upper portion of the apparatus; Fig. 7 is a transverse section taken on the line 7—7 Fig. 4. Fig. 8 is a view corresponding to Fig. 4 but illustrating a variation in the arrangement of certain details of the apparatus; and Fig. 9 is a horizontal section through the lower part of the apparatus, the plane of such section being indicated by line 9—9 on Figs. 2 and 3.

The general method of bonding rails for the carrying out of which the present apparatus is designed is that of electrically soldering, brazing, or welding, the bonding member laterally against the respective ends of two adjoining rails by means of an electric current which is passed through the same, a sufficiently high resistance being interposed in the circuit in proximity to the bond to develop the necessary degree of temperature both to fuse the bond terminal and the contacting face of the rail.

Referring, then, first of all to Fig. 1, A will be seen to designate a truck or platform car movable upon the track, the rails B of which it is thus desired to bond. It is not meant to imply, of course, that the apparatus is limited to use with any particular kind of a support such as a truck or the like; the term "truck," accordingly, is intended to connote any support suited for the purpose in hand, whether vehicular in character or not. Of such rails, two meeting sections are shown with the apparatus now about to be described in proper operative position in reference thereto to effect the aforesaid operation of bonding. Ordinarily the necessary current for carrying out such operation will be derived from the trolley wire and return circuit usually found in connection with the track where the operation of bonding is to be conducted. In this event, suitable apparatus for transforming and converting the current, together with necessary switches, circuit breaker, controller, resistances, and the like, are borne upon such car. So far, however, as the bonding apparatus proper is concerned, it is obviously immaterial whence such current be derived, and accordingly all these parts are omitted, and it is contemplated that, if found necessary, or desirable, any other source of current than that just described, or means for rendering the same available, may be utilized. The apparatus proper, then, comprises base plate 110 or member A' formed with a transverse slide-way $a$ rigidly secured to a corner of the car frame so as to form in effect part thereof. On such slide-way is mounted a block $A^2$ formed in turn with a vertical slide-way $a'$ that bears a third member in the form of a hollow block $A^3$. Movement of the block $A^2$ transversely of the car on slide-way $a$ may be had by operation of a hand-wheel $a^2$ having suitable threaded connection with said block, as will be readily understood. In conjunction with transversely slidable block $A^2$ there is provided a vertical shaft or rod $A^4$ disposed in front of and parallel with the slide-way $a'$ therein on which such vertically slidable block $A^3$ is movable. (See Figs. 2, 3 and 9.) The latter is formed with suitable apertures through which the rod may pass and is longitudinally secured thereto by means of another member $A^5$ in the form of a hollow box-like casting that includes between its ends the slidable member aforesaid and is, in contradistinction to the latter, fixedly secured to said rod. Raising or lowering of the shaft $A^4$, it will hence be seen will be effective to raise and lower said slidable member $A^3$, relatively to the supporting member $A^2$, together with casting $A^5$, that is thus in effect pivotally attached to said slide $A^3$ so as to be oscillatory about a substantially vertical axis.

In the position of parts illustrated in Fig. 1, the slide $A^3$ appears in its lower and, as I shall term it, normal position. In other words, such slide and appurtenant parts are arranged in this position when it is desired to affix a bond $B'$ to a rail B. Conditions of use, more fully referred to hereinafter, render it desirable that for a resetting of the apparatus at points only slightly removed along the rail, as for example adjacent to the respective terminals $b$ of the same bond, means be provided for raising the apparatus just enough to clear the rail; while for transportation of the apparatus over greater distances, these depending parts should be raised high enough to clear effectually all obstacles. Provision is hence had in the first place for vertically raising the shaft $A^4$ and attached parts from their normal position through a distance sufficient to just clear the rail, as stated, and then to return such parts to their former position again. To this end the upper extremity of the shaft is threaded and provided with a clamp collar $a^3$ loosely fitted to such thread and above such clamp collar with a handled nut $a^4$ engaging such thread. The lower face of the clamp collar is formed with a cam edge cooperative with the upper face of a second collar $a^5$, that, resting on a suitable bearing $a^6$ formed on the upper end of the transversely movable block $A^2$, is freely rotatable with respect to the shaft $A^4$. By means of a set screw $a^7$ on clamp collar $a^3$ the latter may be fixedly secured to the shaft in any desired position, whereupon rotation of the lower collar, conveniently had by means of a handle $a^8$ will raise such upper collar and with it the shaft through a distance equal to the throw of the cam on the two engaging faces of the said collars. By loosening the upper collar and then rotating the hand wheel $a^4$ in one way or the other any initial adjustment of the rod can be secured.

For raising the slide $A^3$ to a more elevated position, as may be desirable pending transportation of the apparatus from one place to another on account of the greater speed of the car and increased likelihood of encountering obstacles, a handle in the form of a ring $a^9$ is provided. This handle, shown in Fig. 1 only, is designed to be grasped manually, and the slide bodily raised to the desired position. A spring actuated catch $a^{10}$ pivotally mounted on supporting member $A^2$ is adapted to engage with the slide $A^3$ when the latter is thus raised, and so retain it against dropping to its former position.

Oscillatorily mounted supporting member $A^5$ is provided on each side with a vertical slide-way $a^{11}$ in which are respectively held two slide members $A^6$, the upper ends of which terminate in threaded rods $a^{12}$, that extend above such member $A^5$. Threaded on rods $a^{12}$ are hand wheels $a^{13}$ by rotation of which such slides may be vertically adjusted, as will be obvious. To each such slide is in turn pivotally attached about a transverse axis $a^{14}$ a link C, the lower or free end of which may be secured at any desired distance from the lower end of the slide by means of an adjusting screw $c$ threaded in the slide and loosely engaging the end of the link. The lower end of the slide in which such adjusting screw is mounted is preferably bent out a trifle from the perpendicular since in the more usual position of parts, the link will incline outwardly a trifle as shown, and by having such slide bent accordingly the screw will be alined to support the link squarely.

Pivotally attached, in turn, to the free ends of the links are the electrode members $C'$ $C^2$ proper. Of these the one $C'$ will ordinarily be employed simply to effect electrical connection with the rail when, as in the process of bonding above referred to, such rail is included in the electric circuit. The other electrode $C^2$, on the contrary is provided with a block $c'$ of carbon, or other suitable high resistance material, for developing the necessary degree of temperature to fuse the bond terminal $b$ and contacting rail face. This electrode $C^2$ is accordingly utilized to clamp the bond against the rail, holding it in place pending such fusion of its terminal. The particular construction of electrode herein shown forms no part of the present invention, being fully set up in my co-pending application filed November 20, 1907, Serial No. 402,974. Similarly the particular construction of the electrode C', referred to as being utilized primarily for securing an electrical contact with the rail, forms no part of the present invention, being fully described and claimed in the co-pending application previously referred to herein. It may be remarked, however, that one of the features of such electrode's construction is the provision thereon of a lateral projection $c^2$ disposed to rest on the top surface or tread $b'$ of the rail, whereby not only is a much superior contact to be had, particularly in the case of roads in use, but the weight of the movable part of the apparatus may be in part sustained by the rail leaving the adjustment of the bond clamping electrode member free and unhampered.

The current is conducted to the two electrode members through suitable cables $C^3$, Fig. 1, that in view of the character of such current require to be quite heavy and well insulated. Where a transformer is carried on the platform of the car, these cables will of course be directly connected with the secondary thereon. Of the two electrode members C' $C^2$, it will further be understood, one is suitably insulated from the link C whereby it is suspended from oscillatory block $A^5$ as by an interposed section $c^9$, Fig. 1. Adjustment of the electrodes in or out is had by means of handled adjusting screws $c^3$ that have threaded attachment therewith intermediate of their ends, and are connected at their inner ends with a block $A^7$ attached to and in effect forming a continuation of rod or shaft $A^4$. For the reception of such inner ends of the adjusting screws, this block is provided with vertically disposed, laterally undercut ways $a^{15}$, and the ends of the screws, Fig. 7, are conformed to slidably engage such ways. As a result of the foregoing construction, it will be clear that independent vertical adjustment of the respective electrodes by raising or lowering the slides $A^6$ on the block $A^5$, to which such electrodes are attached, is not interfered with. Of these adjusting screws it should furthermore be remarked the one appertaining to the electrode C', which has been described as being insulated from its supporting link C, is not threaded directly in the material of such member; instead such screw thus engages with a block $c^4$ that is insulated from the electrode. In the case of electrode $C^2$, although insulation is not necessary the corresponding screw engages with a sectional nut $c^5$ mounted upon a block $c^6$ corresponding with block $c^4$; such sectional nut being utilized in order to facilitate adjustment of the outer electrode $C^2$, which, since it serves to clamp the bond to the rail, requires to be opened outwardly and then pressed in again at each successive welding operation. Accordingly by pivotally mounting said nut $c^5$, it may be moved so as to engage the adjusting screw $a^3$ in one position but to leave the same entirely free in another position. Such nut is designed to be locked in its screw-engaging position by means of a handled lever $c^7$ pivotally attached to the block $c^6$ on the electrode and held in whatever position it may be left by means of a spring $c^8$, see Fig. 4. It is further secured, when in its lower position, by having its engaging face of cam formation and so disposed as to be thrown beyond the pivotal axis of the handle. Such cam-face is moreover extended so as to engage and raise the half nut when the handle is thrown upwardly, the latter thus serving to perform two operations.

Pivotal member $A^5$, from which, it has been observed, the electrode-members are suspended, and to the extension $A^7$ of which such electrode-members are attached, is designed to be secured in any desired angular position about its vertical axis formed by shaft $A^4$, by the means fully shown in Fig. 6. Such means comprise simply an adjusting screw D rotatably held in a swiveled stud, or pin, $d'$ mounted laterally of pivotal supporting member $A^5$, and provided with a handle $d$ for convenience in manipulation. The threaded end of such screw engaging a similar swiveled stud, or pin, $d^2$ mounted on the vertical slide $A^3$ in alinement with said pin $d'$, the screw serves in effect as a tangent screw, by means of which not only may the pivotal supporting member be axially adjusted, but also secured in any desired position.

Having thus described the construction of the several parts comprised in my improved bonding apparatus, the general mode of operation may be briefly set forth. The car A is moved along the track until the apparatus, as shown in Fig. 1, is brought substantially over the point where the bond is to be applied. While being thus moved, the apparatus will in general be held in its raised position, as has been described above, by means of the catch $a^{10}$ engaging with member $A^3$. The apparatus, having been thus located, is lowered, by releasing such catch, until the vertical slide with pivotal supporting member $A^5$ and attached parts is supported by the shaft $A^4$ through the two engaging collars $a^3$ $a^5$ that rest on the bearing $a^6$ of the transverse slide $A^2$. The position of the latter it should be remarked will have been adjusted, previously to thus lowering the remainder of the apparatus, so that the two electrode members C' $C^2$ will be disposed, the former on the inside and the latter on the outside of the rail. Since it is desirable as has been explained that the inner contact-making electrode member C' rest on top of the rail, shaft A⁴ will be vertically adjusted by means of hand wheel a⁴, (clamp collar a³ having been first loosened) until this result is attained. Such initial or normal position having been established no readjustment in this particular is required for successive bonds designed to be attached in the same fashion to the rail, e. g. laterally of the head or ball of the rail. Since it is generally conducive to the successful carrying on, of the bonding operation that the resistance bearing electrode press squarely against the face of the bond terminal in clamping the latter to the rail it becomes necessary around curves or turns to properly adjust the axial position of the pivotal supporting member by means of tangent screw D. Transverse adjustment of slide A² will also be necessary in this connection, by reason of the lateral displacement of the apparatus when the car is standing on a curve. In actually applying the bond, handle c⁷, which controls the engagement of adjustment screw c³ with the outer resistance bearing electrode, is raised so as to permit the free outward swinging of such electrode, the bond is then inserted between carbon block c and the rail, the electrode returned to its normal vertical position, such handle operated to close the sectional nut onto the adjusting screw, and, by a slight turn of the latter, the desired degree of pressure applied not only to hold the bond in place, but also to provide proper electrical contact for the bonding operation. As soon as the bond has been affixed, the electrode C² is released in the same manner as before, and the handle a⁸ that operates the lower cam collar a⁵ given a turn whereby the apparatus is raised a short distance sufficient to clear the rail. The car may be now advanced so as to bring the apparatus into operative position with respect to the next joint to be bonded, and the steps just described repeated.

Certain types of bond are designed, instead of being welded to the ball of the rail as has just been described, to be affixed laterally against the web thereof, and even where the first type is utilized it occasionally becomes necessary to adopt the other mode of affixing the bond about switches and the like. For attaching this type of bond, the arrangement of electrodes may be reversed, but where only temporary use of the reversed arrangement would be had, the inconvenience involved in making the change even though slight renders it desirable that other more easily manipulated means be provided. I accordingly utilize for this purpose a supplementary bar or extension E that is adapted to be secured to the lower end of the inner electrode C'. (See Fig. 8.) To this extension there may be secured a holder E' with high-resistance element e, such as is ordinarily employed in connection with the outer electrode C². Indeed the same holder that is thus employed on the latter may be simply transferred to extension E, since such holder will require to be removed anyhow, and the electrode thus bared be drawn against the rail to make electrical contact therewith, although preferably a metallic extension will be affixed for this purpose. Such positioning of electrode C² is easily had by reason of the various adjustments possible in the disposition of the parts from which it is supported. The two electrodes being thus rearranged, the welding operation is otherwise then conducted in the same manner as before.

From the foregoing description, it will be obvious that, because of the various adjustments provided in the apparatus a marked increase in the rapidity with which the welding apparatus can be set up at any desired point, removed, and set up again, is attained. Such celerity of movement in these preparatory operations is highly desirable, particularly where the line upon which the bonding is being carried on is in operation and the frequency of service great, so that those engaged in bonding are liable to frequent interruptions. At the same time I am enabled to accommodate the apparatus to practically every situation that may be encountered, doing away with the necessity of extemporizing apparatus, with attendant large loss of time, for putting on a few bonds on occasional sharp curves or about switches.

Other modes of applying the principle of my invention may be employed instead of the one explained, change being made as regards the mechanism herein disclosed, provided the means stated by any one of the following claims or the equivalent of such stated means be employed.

I therefore particularly point out and distinctly claim as my invention:—

1. In apparatus of the class described, the combination of a truck movable along a track; a transversely movable supporting member borne thereby; a vertically movable supporting member borne by said transversely movable member; and an electrode-member pivotally connected with said vertically movable member about a substantially vertical axis.

2. In apparatus of the class described, the combination of a truck movable along a track; a transversely movable supporting member borne thereby; a vertically movable supporting member borne by said transversely movable member; a third supporting member pivotally attached to said vertically movable member about a vertical axis; and an electrode-member pivotally attached to said third supporting member about a horizontal axis.

3. In apparatus of the class described, the combination with a suitable support; of a member pivotally secured thereto about a vertical axis; and two electrode-members pivotally secured at their upper ends about horizontal axes to said first member.

4. In apparatus of the class described, the combination with a suitable support; of a member pivotally secured thereto about a vertical axis; and two electrode-members pivotally secured at their upper ends about independent horizontal axes to said first member.

5. In apparatus of the class described, the combination of a truck movable along a track; a transversely movable supporting member borne thereby; a second member pivotally secured to said first member about a vertical axis; and two electrode-members pivotally secured at their upper ends about independent horizontal axes to said second member.

6. In apparatus of the class described, the combination of a truck movable along a track; a transversely movable supporting member borne thereby; a vertically movable supporting member borne by said transversely movable member; and an electrode-member pivotally secured to said vertically movable member so as to be independently oscillatory about a vertical and a horizontal axis, respectively.

7. In apparatus of the class described, the combination of a truck movable along a track; a transversely movable supporting member borne thereby; a vertically movable supporting member borne by said transversely movable member; a third member pivotally secured to said vertically movable member about a vertical axis; and two electrode-members pivotally secured at their upper ends about independent horizontal axes to said third member.

8. In apparatus of the class described, the combination with a truck movable along a track; of two electrode-members supported therefrom and disposed to contact with opposite sides of a rail of said track, said members being independently vertically adjustable with respect to said truck.

9. In apparatus of the class described, the combination of a truck movable along a track; a transversely movable supporting member borne thereby; and two electrode-members pivotally secured to said transversely movable member about a common vertical axis and independent horizontal axes, said electrode-members being furthermore independently vertically adjustable with respect to said transversely movable member.

10. In apparatus of the class described, the combination of a truck movable along a track; a transversely movable supporting member borne thereby; a vertically movable supporting member borne by said transversely movable member; and two electrode-members pivotally secured to said vertically movable member about a common vertical axis and independent horizontal axes, said electrode-members being furthermore independently vertically adjustable with respect to said supporting members.

11. In apparatus of the class described, the combination of a truck; a pendent electrode member; and a link freely pivotally connected at its lower end with said member and at its upper end with said truck.

12. In apparatus of the class described, the combination of a truck movable along a track; a transversely movable supporting member borne thereby; a pendent electrode-member; and a link connecting the latter with said supporting member.

13. In apparatus of the class described, the combination of a truck movable along a track; a transversely movable supporting member borne thereby; a vertically movable supporting member borne by said transversely movable member; a pendent electrode-member; and a link connecting the latter with said vertically movable member.

14. In apparatus of the class described, the combination of a truck movable along a track; a transversely movable supporting member borne thereby; a vertically movable supporting member borne by said transversely movable member; a third supporting member pivotally attached to said vertically movable member about a vertical axis; a pendent electrode-member; and a link connecting the latter with said vertically movable member.

15. In apparatus of the class described; the combination of a suitable support; a link pivotally attached at one end to said support; means for securing the free end of said link at an adjustable distance from said support; and a pendent electrode-member pivotally attached to such free end of said link.

16. In apparatus of the class described; the combination of a suitable support; a link pivotally attached at one end to said support; an adjusting screw connecting the free end of said link with said support, whereby the former may be secured at various distances from the latter; and a pendent electrode-member pivotally attached to such free end of said link.

17. In apparatus of the class described, the combination of a suitable support; a link pivotally attached at one end to said support; means for securing the free end of said link at an adjustable distance from said support; a pendent electrode-member pivotally attached to such free end of said link; and means for drawing said electrode-member toward said supporting member.

18. In apparatus of the class described; the combination of a suitable support; a link pivotally attached at one end to said support; an adjusting screw connecting the free end of said link with said support, whereby the former may be secured at various distances from the latter; a pendent electrode-member pivotally attached to such free end of said link; and an adjusting screw connecting said electrode-member with said support, whereby the former may be drawn toward the latter.

19. In apparatus of the class described, the combination of a truck movable along a track; a member supported therefrom so as to be both transversely and vertically adjustable with respect thereto; another member pivotally secured to said first member about a vertical axis; a link pivotally attached at one end to said last named member; means for securing the free end of said link at an adjustable distance from said member; a pendent electrode-member pivotally attached to such free end of said link; and means for drawing said electrode-member toward said last named member.

20. In apparatus of the class described, the combination of a truck movable along a track; a member supported therefrom so as to be both transversely and vertically adjustable with respect thereto; another member pivotally secured to said first member about a vertical axis; a link pivotally attached at one end to said last named member; an adjusting screw connecting the free end of said link with said member whereby the former may be secured at various distances from the latter; a pendent electrode-member pivotally attached to such free end of said link; and an adjusting screw mounted in said electrode-member and rotatably engaging said last-named member.

21. In apparatus of the class described, the combination of a truck; two pendent electrode-members; and links respectively freely pivotally connected at their lower ends with said members and at their upper ends with said truck.

22. In apparatus of the class described, the combination of a truck movable along a track; a transversely movable supporting member borne thereby; two pendent electrode-members; and links respectively connecting said electrode-members with said supporting member.

23. In apparatus of the class described, the combination of a truck movable along a track; a transversely movable supporting member borne thereby; a vertically movable supporting member borne by said transversely movable member; two pendent electrode-members; and links respectively connecting said electrode-members with said vertically movable member.

24. In apparatus of the class described, the combination of a truck movable along a track; a transversely movable supporting member borne thereby; a vertically movable supporting member borne by said transversely movable supporting member; a third supporting member pivotally attached to said vertically movable member about a vertical axis; two pendent electrode-members; and links respectively connecting said electrode-members with said vertically movable member.

25. In apparatus of the class described, the combination of a suitable support; two links, each pivotally attached at one end to said support; means for securing the free ends of said links at adjustable distances from said support; and pendent electrode-members respectively pivotally attached to such free ends of said links.

26. In apparatus of the class described, the combination of a suitable support; two links, each pivotally attached at one end to said support; adjusting screws respectively connecting the free ends of said links with said support, whereby such ends may be secured at various distances from said support; and pendent electrode-members respectively pivotally attached to such free ends of said links.

27. In apparatus of the class described, the combination of a suitable support; two links, each pivotally attached at one end to said support; means for securing the free ends of said links at adjustable distances from said support; pendent electrode-members respectively pivotally attached to such free ends of said links; and means for independently drawing said electrode-members toward said supporting member.

28. In apparatus of the class described, the combination of a suitable support; two links, each pivotally attached at one end to said support; adjusting screws respectively connecting the free ends of said links with said support, whereby such ends may be secured at various distances from said support; pendent electrode-members respectively pivotally attached to such free ends of said links; and adjusting screws respectively connecting said electrode-members with said support, whereby the former may be independently drawn toward the latter.

29. In apparatus of the class described, the combination of a truck movable along a track; a member supported therefrom, said member being both transversely and vertically adjustable with respect thereto; another member pivotally secured to said first member about a vertical axis; two links, each pivotally attached at one end to said last-named member; means for securing the free ends of said links at adjustable distances from said member; pendent electrode-members pivotally attached to such free ends of said links; and means for independently drawing said electrode-members toward said last-named member.

30. In apparatus of the class described, the combination of a truck movable along a track; a member supported therefrom, said member being both transversely and vertically adjustable with respect thereto; another member pivotally secured to said first member about a vertical axis; two links, each pivotally attached at one end to said last-named member; adjusting screws respectively connecting the free ends of said links with said member, whereby such ends may be secured at various distances from the latter; pendent electrode-members respectively pivotally attached to such free ends of said links; and adjusting screws respectively mounted in said electrode-members and rotatably engaging said last-named member for independently drawing said electrode-members toward said last-named member.

31. In apparatus of the class described, the combination of a suitable support; a pendent electrode-member pivotally secured thereto; and means for drawing said member toward said support, said means including a screw loosely mounted in said member and rotatably engaging said support; and a sectional nut optionally movable into engagement with said screw.

32. In apparatus of the class described, the combination of a suitable support; a pendent electrode-member pivotally secured thereto; and means for drawing said member toward said support, said means including a screw loosely mounted in said member and rotatably engaging said support, a sectional nut movably mounted on said member and adapted to engage said screw, and means adapted to retain said nut in operative or inoperative position, as desired.

33. In apparatus of the class described, the combination of a suitable support; a pendent electrode-member pivotally secured thereto; and means for drawing said member toward said support, said means including a screw loosely mounted in said member and rotatably engaging said support, a sectional nut pivotally mounted on said member and adapted to engage said screw, a lever having a cam engagement with said nut to lock the same in operative or inoperative position, as desired, and means for frictionally retaining said lever as placed.

34. In apparatus of the class described, the combination of a truck movable along a track; a member supported therefrom, said member being both transversely and vertically adjustable with respect thereto; another member pivotally secured to said first member about a vertical axis; means for securing said last-named member in various angular positions about such axis; and an electrode-member secured to said last-named member.

35. In apparatus of the class described, the combination of a truck, movable along a track; a member supported therefrom, said member being both transversely and vertically adjustable with respect thereto; another member pivotally secured to said first member about a vertical axis; a vertically adjustable slide borne by said last-named member; and an electrode-member secured to said slide.

36. In apparatus of the class described, the combination of a truck, movable along a track; a member supported therefrom, said member being both transversely and vertically adjustable with respect thereto; another member pivotally secured to said first member about a vertical axis; two independently vertically adjustable slides borne by said last named member; and electrode-members, adapted to clamp a rail between their ends, secured to said slides respectively.

37. In apparatus of the class described, the combination of a truck, movable along a track; a member supported therefrom, said member being both transversely and vertically adjustable with respect thereto; another member pivotally secured to said first member about a vertical axis; means for securing said last-named member in various angular positions about such axis; two independently vertically adjustable slides borne by said member; and electrode-members, adapted to clamp a rail between their ends, secured to said slides respectively.

38. In apparatus of the class described, the combination of a truck, movable along the combination of a truck, movable along a track; a member supported therefrom, said member being both transversely and vertically adjustable with respect thereto; another member pivotally secured to said first member about a vertical axis; means for securing said last-named member in various angular positions about such axis; two independently vertically adjustable slides borne by said member; links pivotally attached at their upper ends to said slides, respectively; and pendent electrode-members, adapted to clamp a rail between their lower ends, pivotally attached to the free ends of said links.

39. In apparatus of the class described, the combination of a truck, movable along a track; a member supported therefrom, said member being both transversely and vertically adjustable with respect thereto; another member pivotally secured to said first member about a vertical axis; means for securing said last-named member in various angular positions about such axis; two independently vertically adjustable slides borne by said member; links pivotally attached at their upper ends to said slides, respectively; means for securing the free ends of said links at adjustable distances from said slides; pendent electrode-members, adapted to clamp a rail between their lower ends, pivotally attached to the free ends of said links; and means for drawing the lower ends of said electrodes together.

40. In apparatus of the class described, the combination of a truck, movable along a track; a member supported therefrom, said member being both transversely and vertically adjustable with respect thereto; another member pivotally secured to said first member about a vertical axis; means for securing said last-named member in various angular positions about such axis; two independently vertically adjustable slides borne by said member; links pivotally attached at their upper ends to said slides, respectively; means for securing the free ends of said links at adjustable distances from said slides; pendent electrode-members, adapted to clamp a rail between their lower ends, pivotally attached to the free ends of said links; and means for independently drawing the lower ends of said electrodes inwardly.

41. In apparatus of the class described, the combination of a truck, movable along a track; a member supported therefrom, said member being both transversely and vertically adjustable with respect thereto; another member pivotally secured to said first member about a vertical axis; means for securing said last-named member in various angular positions about such axis; two independently vertically adjustable slides borne by said member; links pivotally attached at their upper ends to said slides, respectively; means for securing the free ends of said links at adjustable distances from said slides; pendent electrode-members, adapted to clamp a rail between their lower ends, pivotally attached to the free ends of said links; and adjusting screws mounted in said electrodes, respectively, and rotatably engaging said pivotal supporting member.

42. In apparatus of the class described, the combination of a truck, movable along a track; a member supported therefrom, said member being both transversely and vertically adjustable with respect thereto; a second member pivotally secured to said first member about a vertical axis, said second member terminating below in a vertically slotted extension; means for securing said second member in various angular positions about such axis; two independently vertically adjustable slides borne by said second member; links pivotally attached at their upper ends to said slides, respectively; means for securing the free ends of said links at adjustable distances from said slides respectively; pendent electrode-members, adapted to clamp a rail between their lower ends, pivotally attached to the free ends of said links; and adjusting screws mounted in said electrode-members, respectively, and rotatably engaging the slots in the extension of said second member.

43. In apparatus of the class described, the combination of a truck, movable along a track; a member supported therefrom, said member being both transversely and vertically adjustable with respect thereto; a second member pivotally secured to said first member about a vertical axis, said second member terminating below in a vertically slotted extension; means for securing said second member in various angular positions about such axis; two independently vertically adjustable slides borne by said second member; links pivotally attached at their upper ends to said slides, respectively; means for securing the free ends of said links at adjustable distances from said slides respectively; pendent electrode-members, adapted to clamp a rail between their lower ends, pivotally attached to the free ends of said links, one of said electrode members bearing a block of high resistance material; adjusting screws mounted in said electrode-members, respectively, and rotatably engaging the slots in the extension of said second member, the adjusting screw for said resistance-bearing electrode-member being normally only loosely held therein; and means adapted to operatively secure the same thereto.

44. In apparatus of the class described, the combination of a truck movable along a track; an electrode-member secured to said truck, said member being vertically movable with respect to the same; means for normally retaining said member at a predetermined height and means for raising said member from such normal position and then returning the same thereto.

45. In apparatus of the class described, the combination of a truck, movable along a track; an electrode member secured thereto, said member being vertically movable with respect to the same; and means for successively raising said member from a predetermined normal position and then returning the same thereto, such means including a shaft connected with said member, and two collars, one fixedly, the other rotatably, mounted upon said shaft, said collars having a cam-engagement with each other, whereby rotation of the latter thereof is effective to thus raise and lower said shaft.

46. In apparatus of the class described, the combination of a truck movable along a track; an electrode-member secured to said truck, said member being vertically movable with respect to the same; means for normally retaining said member at a predetermined height; means for raising said member from such normal position and then returning the same thereto; and means for adjusting the height of said member in such normal position.

47. In apparatus of the class described, the combination of a truck, movable along a track; an electrode-member secured thereto, said member being vertically movable with respect to the same; a shaft connected with said member; a clamp collar adapted to be fixed to said shaft where desired; and a second collar rotatably mounted upon said shaft adjacent to said clamp collar, said collars having a cam-engagement with each other, whereby rotation of the latter thereof is effective to raise and lower said shaft and said member therewith.

48. In apparatus of the class described, the combination of a truck, movable along a track; an electrode-member secured thereto, said member being vertically movable with respect to the same; a shaft connected with said member; a clamp collar adapted to be fixed to said shaft where desired; a nut threaded on said shaft so as to adjustably support the same upon said collar; and a second collar rotatably mounted upon said shaft adjacent to said clamp collar, said collars having a cam-engagement with each other, whereby rotation of the latter thereof is effective to raise and lower said shaft and said member therewith.

49. In apparatus of the class described, the combination of a truck, movable along a track; a supporting member secured thereto, said member being vertically movable, with respect to the same; a vertically disposed shaft reciprocably mounted in said member; an electrode-member pivotally secured to said shaft and reciprocable therewith; means for securing said supporting member in raised position; and means for successively raising said shaft from a predetermined normal position with respect to said supporting member and then returning the same to such position.

50. In apparatus of the class described the combination of a truck, movable along a track; a supporting member secured thereto, said member being vertically movable with respect to the same; a vertically disposed shaft reciprocably mounted in said member; an electrode-member pivotally secured to said shaft and reciprocable therewith; a catch adapted to secure said supporting member in raised position; a clamp collar adapted to be fixed to said shaft to normally position the same as desired with respect to said member; and a second collar, said collars having a cam-engagement with each other, whereby rotation of the latter thereof is effective to raise and lower said shaft relatively to said supporting member.

51. In apparatus of the class described, the combination of a truck, movable along a track; a supporting member secured thereto, said member being vertically movable with respect to the same; a vertically disposed shaft reciprocably mounted in said member; an electrode-member pivotally secured to said shaft and reciprocable therewith; a catch adapted to secure said supporting member in raised position; a clamp collar adapted to be fixed to said shaft to normally position the same as desired with respect to said member; a nut threaded on said shaft so as to adjustably support the same upon said clamp collar; and a second collar rotatably mounted upon said shaft adjacent to said clamp collar, said collars having a cam-engagement with each other, whereby rotation of the latter thereof is effective to raise and lower said shaft relatively to said supporting member.

Signed by me, this 3rd day of June, 1908.

WILLIAM A. NEFF.

Attested by—
  E. R. RODD,
  JNO. F. OBERLIN.